(12) United States Patent
Ono et al.

(10) Patent No.: US 11,631,543 B2
(45) Date of Patent: *Apr. 18, 2023

(54) MULTI-LAYER CERAMIC ELECTRONIC COMPONENT AND METHOD OF PRODUCING THE SAME

(71) Applicant: TAIYO YUDEN CO., LTD., Tokyo (JP)

(72) Inventors: Ryo Ono, Takasaki (JP); Tetsuhiko Fukuoka, Takasaki (JP); Shoji Kusumoto, Takasaki (JP); Akihiko Kono, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/498,558

(22) Filed: Oct. 11, 2021

(65) Prior Publication Data

US 2022/0028619 A1 Jan. 27, 2022

Related U.S. Application Data

(63) Continuation of application No. 16/711,210, filed on Dec. 11, 2019, now Pat. No. 11,177,071.

(30) Foreign Application Priority Data

Dec. 20, 2018 (JP) .............................. JP2018-238087

(51) Int. Cl.
*H01G 4/30* (2006.01)
*H01G 4/12* (2006.01)
(Continued)

(52) U.S. Cl.
CPC ............... *H01G 4/30* (2013.01); *H01G 4/012* (2013.01); *H01G 4/1227* (2013.01); *H01G 4/248* (2013.01)

(58) Field of Classification Search
CPC ...... H01G 4/248; H01G 4/012; H01G 4/1209; H01G 4/232; H01G 4/30; H01G 4/0085; H01G 4/1227; H01G 4/2325; H01G 4/224

See application file for complete search history.

(56) References Cited

U.S. PATENT DOCUMENTS 11,177,071 B2 * 11/2021 Ono ........................ H01G 4/232
2009/0284897 A1 * 11/2009 Itamura ................. H01G 4/232
29/25.42

(Continued)

FOREIGN PATENT DOCUMENTS

JP 2015111655 A 6/2015

OTHER PUBLICATIONS

Notice of Allowance issued by U.S Patent and Trademark Office, dated Oct. 14, 2021, for U.S. Appl. No. 16/711,210 (13 pages).

(Continued)

*Primary Examiner* — Michael P McFadden
(74) *Attorney, Agent, or Firm* — Law Office of Katsuhiro Arai

(57) ABSTRACT

A multi-layer ceramic electronic component includes a ceramic body and an external electrode, the ceramic body including a protective portion and a functional portion, the protective portion including an end surface facing in a first direction, circumferential surfaces connected to the end surface and extending in the first direction, and a ridge that includes a recess extending along the first direction and connects the circumferential surfaces, the functional portion being disposed inside the protective portion, the external electrode including a base film covering the end surface, an intermediate film formed on the base film, and a surface film formed on the intermediate film, the base film including a first covering portion formed on the end surface, second covering portions formed on the circumferential surfaces, (Continued)

and a third covering portion formed on the recess and spaced apart from at least one second covering portion, the intermediate film continuously covering the first, second, and third covering portions.

5 Claims, 9 Drawing Sheets

(51) Int. Cl.
  *H01G 4/248* (2006.01)
  *H01G 4/012* (2006.01)

(56) References Cited

U.S. PATENT DOCUMENTS

| | | | | |
|---|---|---|---|---|
| 2014/0326493 | A1* | 11/2014 | Lee | H05K 1/0306 |
| | | | | 361/301.4 |
| 2015/0243439 | A1* | 8/2015 | Kwag | H05K 1/181 |
| | | | | 361/301.4 |
| 2017/0301470 | A1* | 10/2017 | Asai | H01G 4/232 |
| 2017/0301471 | A1* | 10/2017 | Ono | H01G 4/224 |
| 2017/0330689 | A1* | 11/2017 | Hatanaka | H01G 2/065 |
| 2018/0182552 | A1* | 6/2018 | Sawada | H01G 4/232 |

OTHER PUBLICATIONS

A Notification of Reasons for Refusal issued by the Japanese Patent Office, dated Nov. 1, 2022, for Japanese counterpart application No. 2018-238087. (2 pages).

\* cited by examiner

MULTI-LAYER CERAMIC ELECTRONIC COMPONENT AND METHOD OF PRODUCING THE SAME

CROSS-REFERENCE TO RELATED APPLICATION

This is application is a continuation of U.S. patent application Ser. No. 16/711,210, filed Dec. 11, 2019, which claims priority to Japanese Patent Application No. 2018-238087, filed Dec. 20, 2018, each disclosure of which is herein incorporated by reference in its entirety. The applicant herein explicitly rescinds and retracts any prior disclaimers or disavowals made in any parent, child or related prosecution history with regard to any subject matter supported by the present application.

BACKGROUND ART

The present disclosure relates to a multi-layer ceramic electronic component and a method of producing the multi-layer ceramic electronic component.

A multi-layer ceramic electronic component such as a multi-layer ceramic capacitor includes a ceramic body and external electrodes. The ceramic body includes laminated internal electrodes. The external electrodes cover respective end surfaces of the ceramic body. Typically, each of the external electrodes continuously covers the corresponding end surface and part of a plurality of circumferential surfaces connected to the end surface.

Meanwhile, an electrode material and a ceramic material that constitute the external electrodes have different linear expansion coefficients, and thus the external electrodes accumulate stress due to heat generation after thermal treatment or mounting, and defects such as cracks occur in the ceramic body or the external electrodes in some cases.

Japanese Patent Application Laid-open No. 2015-111655 (hereinafter, referred to as Patent Document 1) discloses a ceramic electronic component including fired electrode layers each including first to fifth portions, the first to fifth portions being at least partially separated from one another, from the viewpoint of preventing cracks from occurring.

SUMMARY OF THE INVENTION

However, in the configuration described in Patent Document 1, it has been difficult to control the width, with which the first to fifth portions of the fired electrode layer are separated from one another, and thus Cu plating films that cover the first to fifth portions have been liable to be separated from one another. In a case where the Cu plating films are separated from one another, there is a probability that an insulation failure and the like occur in a multi-layer ceramic capacitor obtained after plating, which makes it difficult to ensure reliability.

In view of the circumstances as described above, it is desirable to provide a multi-layer ceramic electronic component and a method of producing the multi-layer ceramic electronic component, which are capable of preventing occurrence of defects and enhancing reliability.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a multi-layer ceramic electronic component including a ceramic body and an external electrode.

The ceramic body includes a protective portion and a functional portion.

The protective portion includes an end surface facing in a first direction, circumferential surfaces connected to the end surface and extending in the first direction, and a ridge that includes a recess and an outer edge and connects the circumferential surfaces. The recess extends along the first direction. The outer edge includes an edge, the edge being formed at the outer edge and bulging outward.

The functional portion is disposed inside the protective portion.

The external electrode includes a base film covering the end surface, and a plating film formed on the base film.

The base film includes a first covering portion formed on the end surface, second covering portions formed on the respective circumferential surfaces, and a third covering portion formed on the recess and spaced apart from at least one of the second covering portions at the edge.

The plating film continuously covers the first covering portion, the second covering portions, and the third covering portion.

The base film containing an electrode material and the ceramic body have different linear expansion coefficients, and thus the second covering portions are subjected to stress in different directions by heating and cooling. In the base film of the external electrode having the configuration described above, the second covering portions on the circumferential surfaces are spaced apart from the third covering portion on the recess. Thus, the influence of the stress is eliminated in the discontinuous region of the base film, which makes it difficult to accumulate the stress in the external electrode or the ceramic body. This prevents the ceramic body from being damaged due to the stress. Moreover, since the ceramic body includes the recess adjacent to the edge, the electrode material of the base film easily remains within the recess, and the discontinuous region of the base film can be minimized. Accordingly, the plating film is continuously formed also in the discontinuous region of the base film, which can prevent breakage of the whole external electrode.

The functional portion may include internal electrodes laminated in a second direction orthogonal to the first direction. Positions of end portions of the internal electrodes in a third direction orthogonal to the first direction and the second direction may be aligned with one another within a range of 0.5 µm in the third direction.

Accordingly, the ratio of the functional portion to the ceramic body can be sufficiently ensured. Therefore, a highly functional multi-layer ceramic electronic component can be obtained without increasing the size.

According to another embodiment of the present disclosure, there is provided a method of producing a multi-layer ceramic electronic component, the method including: producing a ceramic body, the ceramic body including a protective portion and a functional portion, the protective portion including an end surface facing in a first direction, circumferential surfaces connected to the end surface and extending in the first direction, and a ridge that includes a recess and an outer edge and connects the circumferential surfaces, the recess extending along the first direction, the outer edge including an edge, the edge being formed at the outer edge and bulging outward, the functional portion being disposed inside the protective portion; forming an electrically conductive base film, the base film including a first covering portion formed on the end surface, second covering portions formed on the respective circumferential surfaces, and a third covering portion formed on the recess and spaced apart from at least one of the second covering portions at the edge; and forming a plating film that continuously covers the first covering portion, the second covering portions, and the third covering portion.

The producing a ceramic body may include producing a ceramic multi-layer chip, the ceramic multi-layer chip including internal electrodes laminated in a second direction orthogonal to the first direction, the internal electrodes being exposed from a side surface of the ceramic multi-layer chip, the side surface facing in a third direction orthogonal to the first direction and the second direction, forming a first side margin laminated on the side surface, and a second side margin laminated on the first side margin and having a heat shrinkage rate larger than a heat shrinkage rate of the first side margin, and sintering the ceramic multi-layer chip, the first side margin, and the second side margin.

In this configuration, the second side margin shrinks more largely than the first side margin by the sintering. Accordingly, an outer edge of the second side margin is formed inward relative to an outer edge of the first side margin, and the recess is formed between those outer edges. Therefore, the ceramic body with the configuration described above is easily produced.

The first side margin may be formed by attaching a first ceramic sheet to the side surface, and the second side margin may be formed by attaching a second ceramic sheet to the first ceramic sheet, the second ceramic sheet having a heat shrinkage rate larger than a heat shrinkage rate of the first ceramic sheet.

Accordingly, the first side margin and the second side margin can be easily formed.

As described above, according to the present disclosure, it is possible to provide a multi-layer ceramic electronic component and a method of producing the multi-layer ceramic electronic component, which are capable of preventing occurrence of defects and enhancing reliability.

These and other objects, features and advantages of the present disclosure will become more apparent in light of the following detailed description of embodiments thereof, as illustrated in the accompanying drawings.

It is to be understood that both the foregoing general description and the following detailed description are exemplary and explanatory, and are intended to provide further explanation of the invention as claimed.

DETAILED DESCRIPTION OF THE EMBODIMENTS

Hereinafter, an embodiment of the present disclosure will be described with reference to the drawings.

In the figures, an X axis, a Y axis, and a Z axis orthogonal to one another are shown as appropriate. The X axis, the Y axis, and the Z axis are common in all figures.

1. Overall Configuration of Multi-Layer Ceramic Capacitor 10

FIGS. 1 to 4 each show a multi-layer ceramic capacitor 10 according to a first embodiment of the present disclosure.

Figure 1:
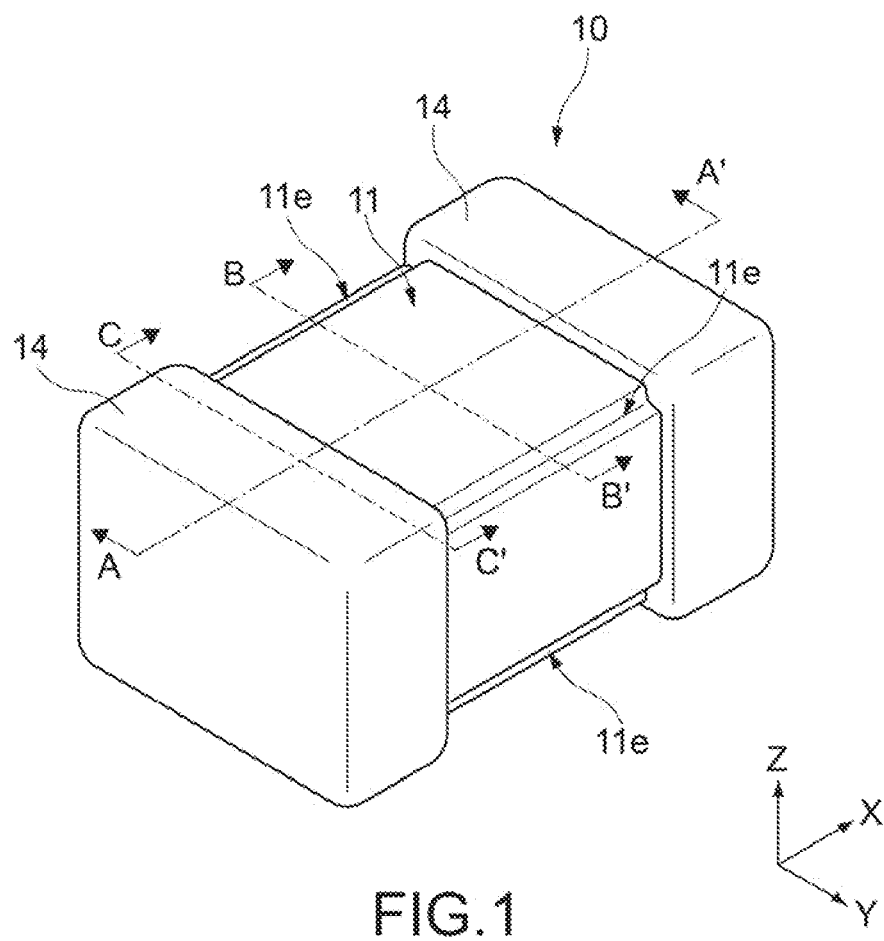
FIG. 1 is a perspective view of a multi-layer ceramic capacitor according to an embodiment of the present disclosure.
Figure 2:
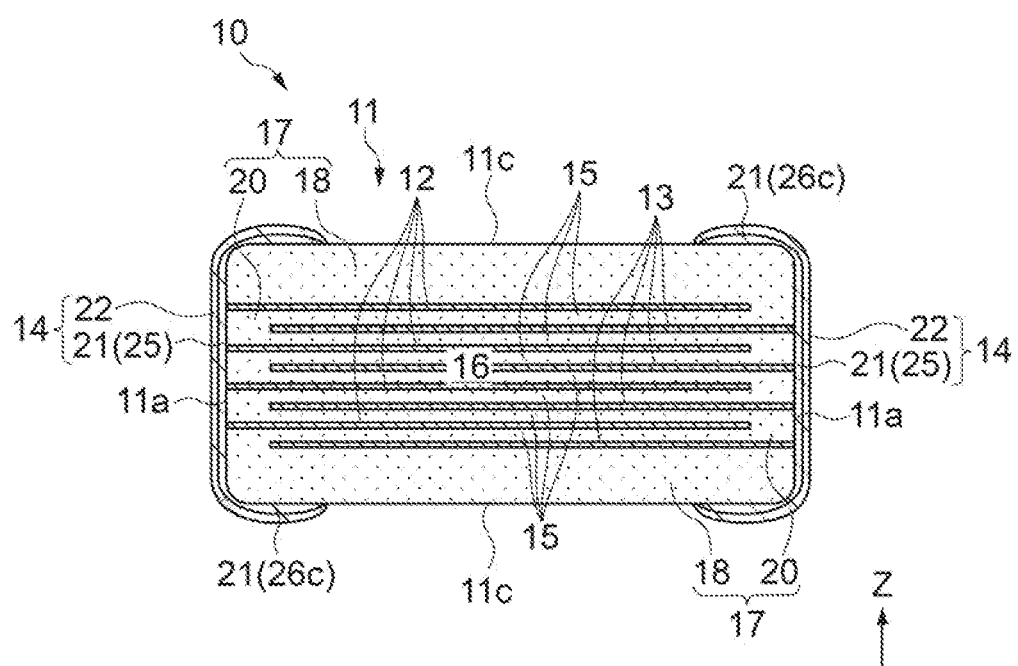
FIG. 2 is a cross-sectional view of the multi-layer ceramic capacitor taken along the A-A' line in FIG. 1.
Figure 3:
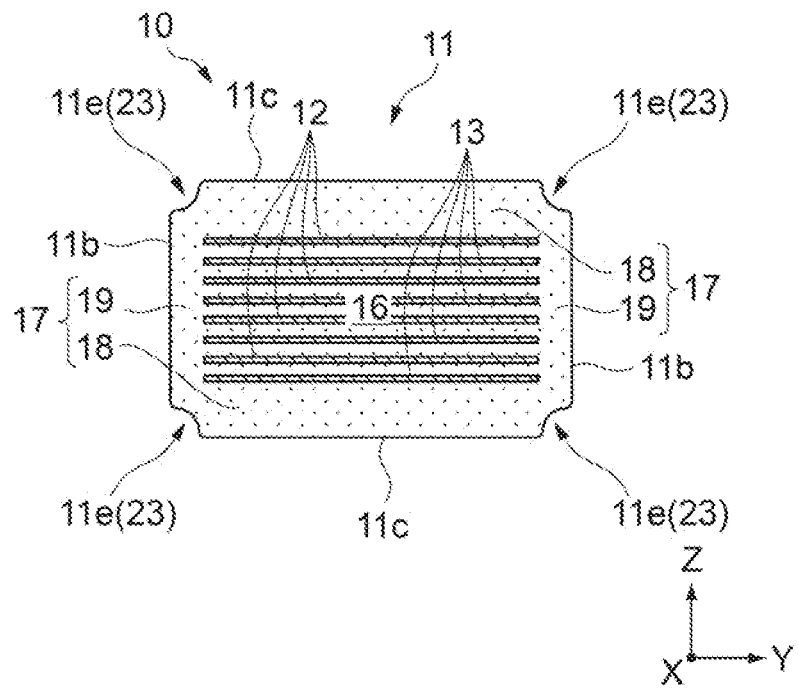
FIG. 3 is a cross-sectional view of the multi-layer ceramic capacitor taken along the B-B' line in FIG. 1.
Figure 4:
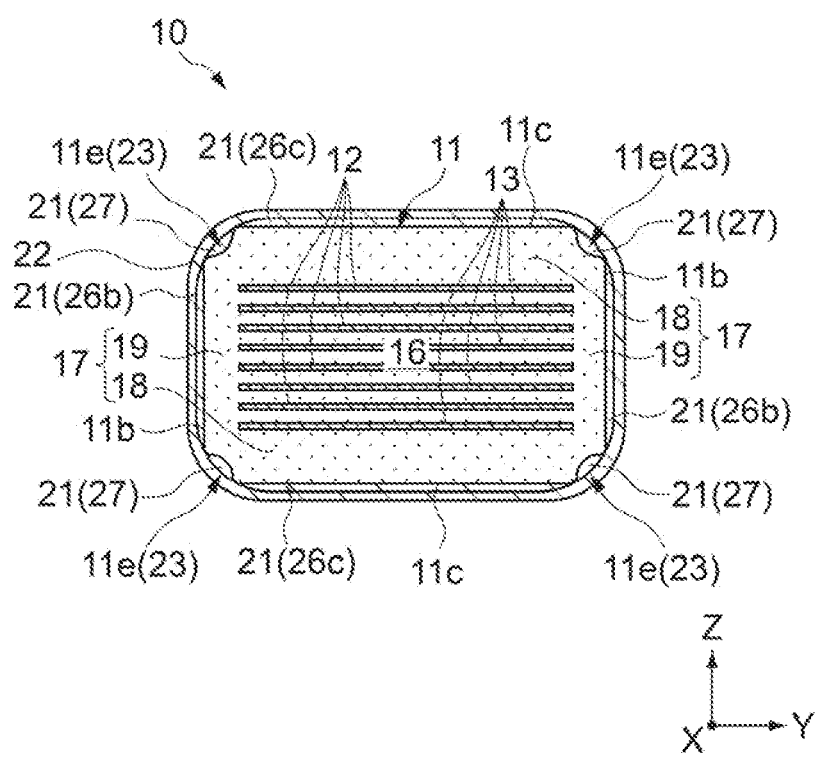
FIG. 4 is a cross-sectional view of the multi-layer ceramic capacitor taken along the C-C' line in FIG. 1.

FIG. 1 is a perspective view of the multi-layer ceramic capacitor 10. FIG. 2 is a cross-sectional view of the multi-layer ceramic capacitor 10 taken along the A-A' line in FIG. 1. FIG. 3 is a cross-sectional view of the multi-layer ceramic capacitor 10 taken along the B-B' line in FIG. 1. FIG. 4 is a cross-sectional view of the multi-layer ceramic capacitor 10 taken along the C-C' line in FIG. 1.

The multi-layer ceramic capacitor 10 includes a ceramic body 11 and two external electrodes 14. The two external electrodes 14 are each formed on the surface of the ceramic body 11.

The ceramic body 11 includes a capacitance forming unit 16 and a protective portion 17. The protective portion 17 constitutes a circumferential portion of the ceramic body 11 and has two end surfaces 11a facing in the X-axis direction, two side surfaces 11b facing in the Y-axis direction, two main surfaces 11c facing in the Z-axis direction, and ridges 11e connecting the main surfaces 11c and the side surfaces 11b to each other. The side surfaces 11b and the main surfaces 11c constitute a plurality of circumferential surfaces in this embodiment.

The end surfaces 11a, the side surfaces 11b, and the main surfaces 11c are formed of, for example, substantially flat surfaces, but may be rounded.

Specifically, the protective portion 17 includes covers 18, side margins 19, and end margins 20. The covers 18 are positioned on the outside of the capacitance forming unit 16 in the Z-axis direction. The side margins 19 are positioned on the outside of the capacitance forming unit 16 in the Y-axis direction. The end margins 20 are positioned on the outside of the capacitance forming unit 16 in the X-axis direction.

The capacitance forming unit 16 is disposed inside the protective portion 17 and constitutes a functional portion in this embodiment. The capacitance forming unit 16 includes a plurality of first internal electrodes 12 and a plurality of second internal electrodes 13, which are laminated in the Z-axis direction via ceramic layers 15 (see FIG. 2). The first internal electrodes 12 and the second internal electrodes 13 each have a sheet-like shape extending along the X-Y plane and are alternately disposed along the Z-axis direction.

The first internal electrodes 12 and the second internal electrodes 13 are each formed of a good conductor of electricity and function as internal electrodes of the multi-layer ceramic capacitor 10. Examples of the good conductor of electricity forming the first and second internal electrodes 12 and 13 include a metal mainly containing nickel (Ni), copper (Cu), palladium (Pd), platinum (Pt), silver (Ag), gold (Au), or the like, and an alloy of those metals.

As shown in FIG. 2, the first internal electrodes 12 and the second internal electrodes 13 are connected to the external electrodes 14, which cover the end surfaces 11a. The first internal electrodes 12 are drawn to, for example, one of the end surfaces 11a of the ceramic body 11 and connected to one of the external electrodes 14. The second internal electrodes 13 are drawn to the other end surface 11a and connected to the other external electrode 14.

The ceramic layer 15 is formed of dielectric ceramics. In the multi-layer ceramic capacitor 10, in order to increase a capacitance of each ceramic layer 15 provided between the first internal electrode 12 and the second internal electrode 13, dielectric ceramics having a high dielectric constant is used. Examples of the dielectric ceramics having a high dielectric constant include a material having a Perovskite structure containing barium (Ba) and titanium (Ti), which is typified by barium titanate ($BaTiO_3$).

Further, examples of the dielectric ceramics may include a strontium titanate ($SrTiO_3$) based material, a calcium titanate ($CaTiO_3$) based material, a magnesium titanate ($MgTiO_3$) based material, a calcium zirconate ($CaZrO_3$) based material, a calcium zirconate titanate ($Ca(Zr,Ti)O_3$) based material, a barium zirconate ($BaZrO_3$) based material, and a titanium oxide ($TiO_2$) based material, other than a barium titanate based material.

The protective portion 17 is also formed of dielectric ceramics. The material forming the protective portion 17 only needs to be insulating ceramics, but if a material having a composition system similar to that of the ceramic layers 15 is used therefor, production efficiency is increased, and internal stress in the ceramic body 11 is suppressed.

Each of the external electrodes 14 includes a base film 21 and a plating film 22. The base film 21 is formed so as to cover the end surface 11a. The plating film 22 is formed on the base film 21. The base film 21 includes a baked film obtained by, for example, sintering an electrically conductive paste, a sputtering film, or the like. The plating film 22 is a film formed by electrolytic plating. Each film of the external electrode 14 is formed of, for example, a metal mainly containing nickel (Ni), copper (Cu), tin (Sn), palladium (Pd), platinum (Pt), silver (Ag), gold (Au), or the like, and an alloy of those metals.

The base film 21 of the external electrode 14 includes an end-surface-covering portion 25 formed on the end surface 11a, main-surface-covering portions 26c formed on the main surfaces 11c, side-surface-covering portions 26b formed on the side surfaces 11b, and recess-covering portions 27 formed on recesses 23 to be described later. In this embodiment, the end-surface-covering portion 25 corresponds to a first covering portion, the main-surface-covering portions 26c and the side-surface-covering portions 26b correspond to second covering portions, and the recess-covering portion 27 corresponds to a third covering portion.

This embodiment is characterized in that the side-surface-covering portion 26b and the main-surface-covering portion 26c of the base film 21 are each spaced apart from the recess-covering portion 27 at a ridge 11e and that such a discontinuous portion is also covered with the plating film 22. Hereinafter, the configuration in the vicinity of the ridge 11e will be described in detail.

2. Detailed Configuration of Multi-Layer Ceramic Capacitor 10

Figure 5:
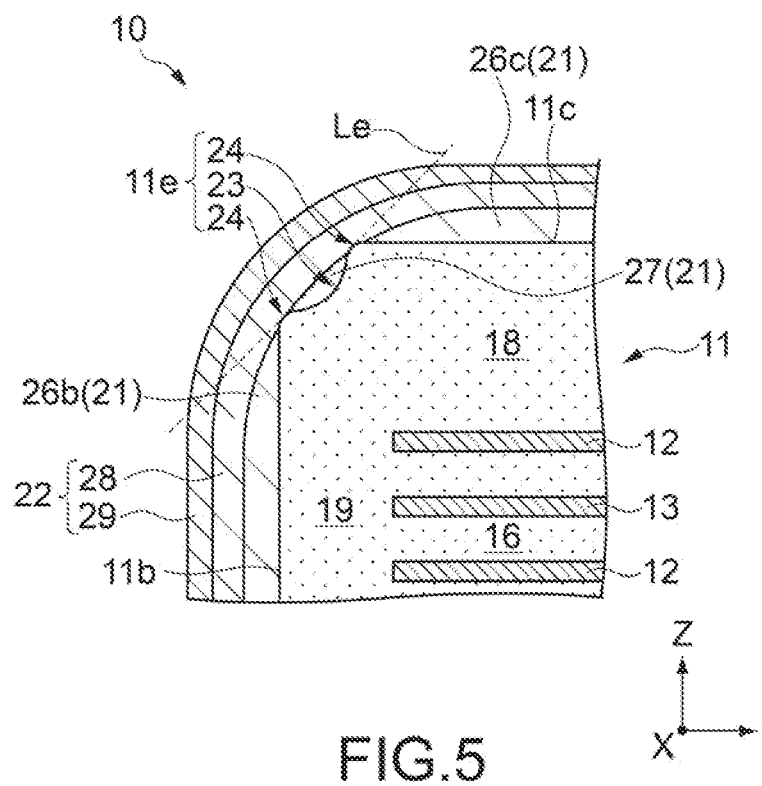
FIG. 5 is an enlarged cross-sectional view of FIG. 4.

FIG. 5 is an enlarged view of FIG. 4 and a view showing configurations of the ridge 11e and the vicinity thereof. FIG. 5 shows the configurations of a single ridge 11e and the vicinity thereof, but the same holds true for configurations of the other ridges 11e and the vicinities thereof.

The ridge 11e includes a recess 23 extending along the X-axis direction. The outer edge of the recess 23 includes edges 24. Each of the edges 24 forms the boundary between the main surface 11c or the side surface 11b and the recess 23 and bulges outward. The edges 24 are formed as a pair with a single recess 23 being sandwiched therebetween.

The recess 23 is a portion depressed inward in the ceramic body 11 from a straight line Le, the straight line Le connecting the two edges 24 on a cross section taken along a virtual cut plane that is parallel to the Y-Z plane. Fine differences in level or irregularities may be formed within the recess 23 so as not to protrude from the straight line Le.

As described above, the main-surface-covering portion 26c of the base film 21 is formed on the main surface 11c, and the side-surface-covering portion 26b of the base film 21 is formed on the side surface 11b. The recess-covering portion 27 of the base film 21 is formed on the recess 23. The recess-covering portion 27 is spaced apart from at least one of the main-surface-covering portion 26c or the side-surface-covering portion 26b at the edge 24. In this embodiment, the recess-covering portion 27 is spaced apart from both of the main-surface-covering portion 26c and the side-surface-covering portion 26b.

In this embodiment, the plating film 22 has a multi-layer structure. The plating film 22 includes an intermediate film 28 and a surface film 29. The intermediate film 28 is formed on the base film 21. The surface film 29 is formed on the intermediate film 28. The intermediate film 28 and the surface film 29 continuously cover the whole of the end-surface-covering portion 25, the main-surface-covering portion 26c, the side-surface-covering portion 26b, and the recess-covering portion 27 of the base film 21. The metal material of the intermediate film 28 and the metal material of the surface film 29 may be the same or different. The metal material may be selected from, for example, copper, nickel, tin, or an alloy of those metals.

The base film 21 includes the main-surface-covering portion 26c, the side-surface-covering portion 26b, and the recess-covering portion 27, which are spaced apart from one another. Thus, defects such as cracks of the ceramic body 11 that are caused by a temperature change can be prevented from occurring.

The electrode material of the base film 21 and the ceramic material of the ceramic body 11 have different linear expansion coefficients. Accordingly, after baking of the base film 21 or at the time of cooling of the heat generated after mounting, the base film 21 shrinks more largely than the ceramic body 11, and tensile stress is generated in the base film 21. Meanwhile, compressive stress resulting from the tensile stress is generated in the ceramic body 11.

In the main-surface-covering portion 26c of the base film 21, for example, tensile stress directed inward in the Y-axis direction is generated. In the side-surface-covering portion 26b of the base film 21, for example, tensile stress directed inward in the Z-axis direction is generated. Accordingly, the tensile stress toward different directions is generated in the base film 21 in the vicinity of the ridge 11e.

In this embodiment, the main-surface-covering portion 26c and the side-surface-covering portion 26b are spaced apart from each other. With this configuration, even if the tensile stress described above is generated, the stress is not accumulated in the base film 21. Therefore, it is possible to prevent large compressive stress from being generated in the ceramic body 11 and to prevent defects such as cracks from being caused in the ceramic body 11.

Moreover, in this embodiment, the recess-covering portion 27 is formed in the recess 23. The recess-covering portion 27 allows the electrode material of the base film 21 to remain within the recess 23 and allows a separation width between the base films 21 to be minimized.

Figure 6:
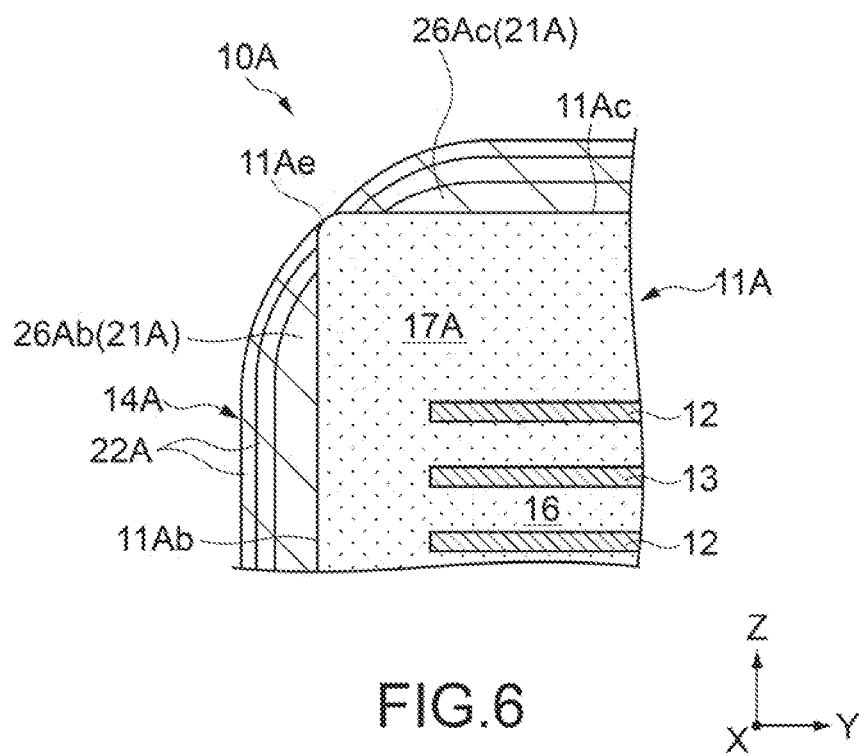
FIG. 6 is an enlarged cross-sectional view of a multi-layer ceramic capacitor according to Comparative example of the embodiment.

FIG. 6 is a cross-sectional view showing a configuration of a multi-layer ceramic capacitor 10A according to Comparative example and is an enlarged view showing a part similar to FIG. 5.

The multi-layer ceramic capacitor 10A does not include a recess in a protective portion 17A, and a side surface 11Ab and a main surface 11Ac of a ceramic body 11A are connected to each other at a ridge 11Ae. The ridge 11Ae is formed of a curved surface, which bulges outward, of the ceramic body 11A.

In a case where a base film 21A of the ceramic body 11A is intended to be disconnected at the ridge 11Ae, a main-surface-covering portion 26Ac and a side-surface-covering portion 26Ab, which are adjacent to each other, are configured to be spaced apart from each other. The ridge 11Ae is sharply curved at an angle close to a right angle, which makes it difficult to control the separation width between the main-surface-covering portion 26Ac and the side-surface-covering portion 26Ab. As a result, the separation width between the main-surface-covering portion 26Ac and the side-surface-covering portion 26Ab increases, and the ridge 11Ae is liable to protrude between the main-surface-covering portion 26Ac and the side-surface-covering portion 26Ab.

In a case where a plating film 22A is formed on the base film 21A, the plating film 22A has difficulty in covering the ridge 11Ae and becomes discontinuous on the ridge 11Ae. Thus, a gap is formed between the ridge 11Ae of the ceramic body 11A and an external electrode 14A. If moisture in the atmosphere enters the gap, the multi-layer ceramic capacitor 10A causes an insulation failure, which makes it difficult to ensure reliability.

Meanwhile, in this embodiment shown in FIG. 5, the recess-covering portion 27 is formed of the electrode material remaining within the recess 23. This makes it possible to regulate the separation width between the main-surface-covering portion 26c or the side-surface-covering portion 26b and the recess-covering portion 27 of the base film 21, and to continuously cover the whole of the base film 21 by the plating film 22. This makes it possible to prevent generation of the gap between the external electrode 14 and the ceramic body 11 and to prevent occurrence of an insulation failure. Therefore, it is possible to enhance the reliability of the multi-layer ceramic capacitor 10.

Further, in the ceramic body 11A according to Comparative example, examples of an approach of reliably covering the ridge 11Ae with the external electrode 14A includes an approach of rounding the corner of the ridge 11Ae by barrel polishing or the like. However, as will be described later, in a case where a ceramic sheet is attached to form a side margin, the ceramic sheet may be peeled off due to barrel polishing, and the side margin is liable to cause defects.

In this embodiment, as will be described in the following production method, an adequate shape of the ridge 11e can be provided without performing barrel polishing, and defects such as peeling of the side margins 19 can be prevented from occurring. This makes it possible to further enhance the reliability of the multi-layer ceramic capacitor 10.

3. Method of Producing Multi-Layer Ceramic Capacitor 10

Figure 7:
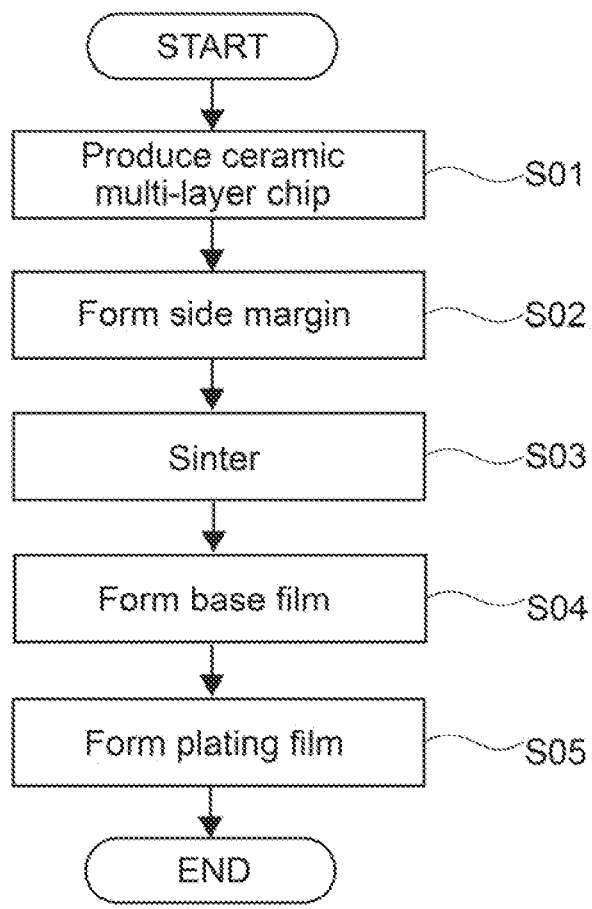
FIG. 7 is a flowchart showing an example of a method of producing the multi-layer ceramic capacitor.

FIG. 7 is a flowchart showing a method of producing the multi-layer ceramic capacitor 10. FIGS. 8 to 14 are views each schematically showing a production process of the multi-layer ceramic capacitor 10. Hereinafter, the method of producing the multi-layer ceramic capacitor 10 will be described along FIG. 7 with reference to FIGS. 8 to 14 as appropriate.

3.1 Step S01: Production of Ceramic Multi-Layer Chip C

In Step S01, ceramic sheets 101 and ceramic sheets 102 for forming the capacitance forming unit 16, and ceramic sheets 103 for forming the covers 18 are laminated and cut to produce unsintered ceramic multi-layer chips (multi-layer chips) C.

Figure 8:
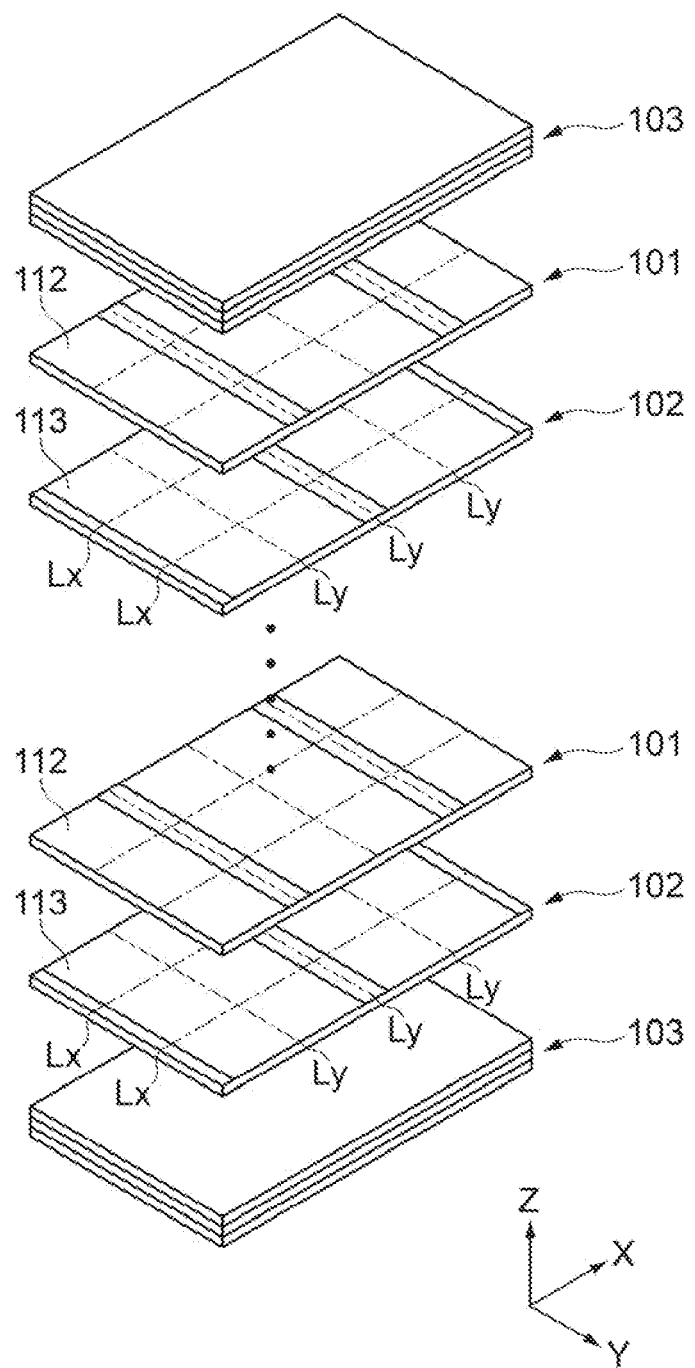
FIG. 8 is a perspective view showing a production process of the multi-layer ceramic capacitor.

The ceramic sheets 101, 102, and 103 shown in FIG. 8 are configured as unsintered dielectric green sheets each containing a ceramic material made of dielectric ceramics, an organic binder, and other additive. Unsintered first internal electrodes 112 corresponding to the first internal electrodes 12 are formed on the ceramic sheets 101. Unsintered second internal electrodes 113 corresponding to the second internal electrodes 13 are formed on the ceramic sheets 102. Internal electrodes are not formed on the third ceramic sheets 103.

Each of the first and second internal electrodes 112 and 113 has a plurality of belt-like electrode patterns, which extend across cutting lines Lx parallel to the X-axis direction and along cutting lines Ly parallel to the Y-axis direction. Those first and second internal electrodes 112 and 113 are formed by applying an electrically conductive paste to the ceramic sheets 101 and 102 by printing or the like.

As shown in FIG. 8, the ceramic sheets 101 and 102 are alternately laminated in the Z-axis direction. The laminate of the ceramic sheets 101 and 102 corresponds to the capacitance forming unit 16 and the end margins 20. The ceramic sheets 103 are laminated on the upper and lower surfaces of the laminate of the ceramic sheets 101 and 102 in the Z-axis direction. The laminate of the ceramic sheets 103 corresponds to the cover 18.

It should be noted that the number of laminated ceramic sheets 101, 102, and 103 or the like can be adjusted as appropriate.

Figure 9:
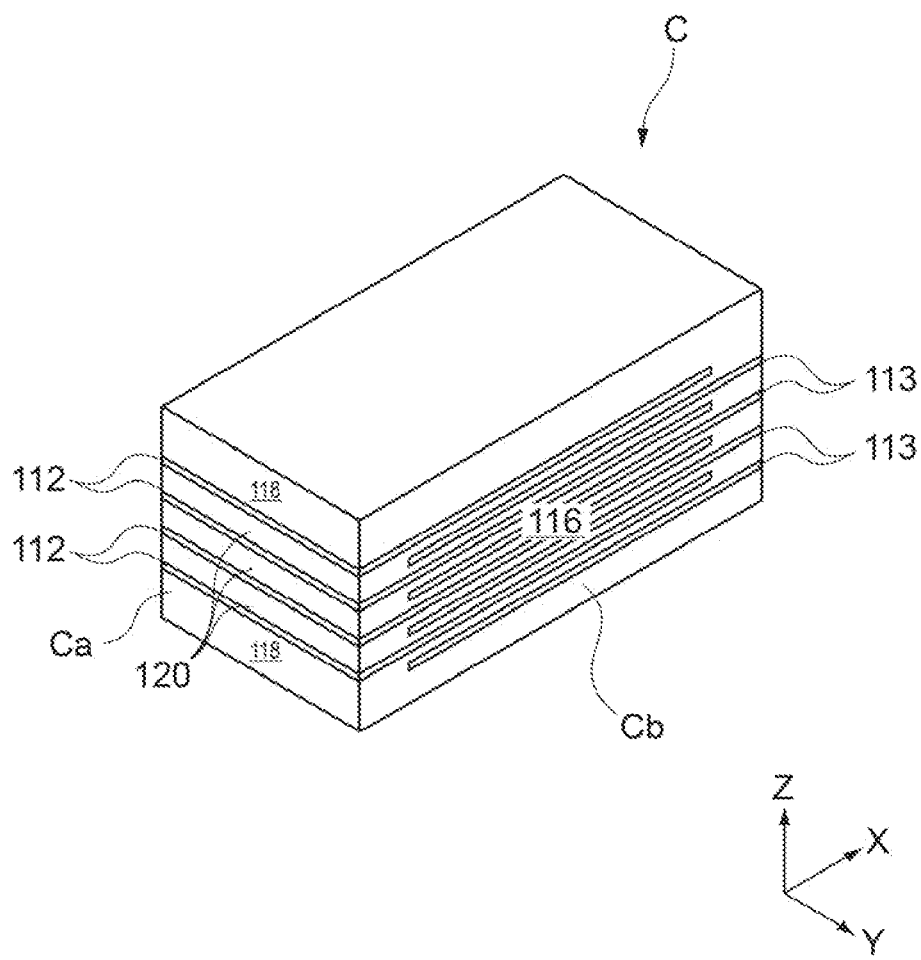
FIG. 9 is a perspective view showing a production process of the multi-layer ceramic capacitor.

Subsequently, the laminate of the ceramic sheets 101, 102, and 103 is pressure-bonded in the Z-axis direction and cut along the cutting lines Lx and Ly. Accordingly, a multi-layer chip C shown in FIG. 9 is produced.

The multi-layer chip C includes an unsintered capacitance forming unit 116, which includes the first and second internal electrodes 112 and 113, unsintered covers 118, and unsintered end margins 120. The multi-layer chip C has side surfaces Cb, which are cut surfaces corresponding to the cutting lines Lx, and end surfaces Ca, which are cut surfaces corresponding to the cutting lines Ly.

End portions of the unsintered first and second internal electrodes 112 and 113 are exposed from the side surfaces Cb.

3.2 Step S02: Formation of Side Margin 119

In Step S02, side margins 119 are formed on the side surfaces Cb of the multi-layer chip C. Hereinafter, an example of the formation method will be described.

Figure 10:
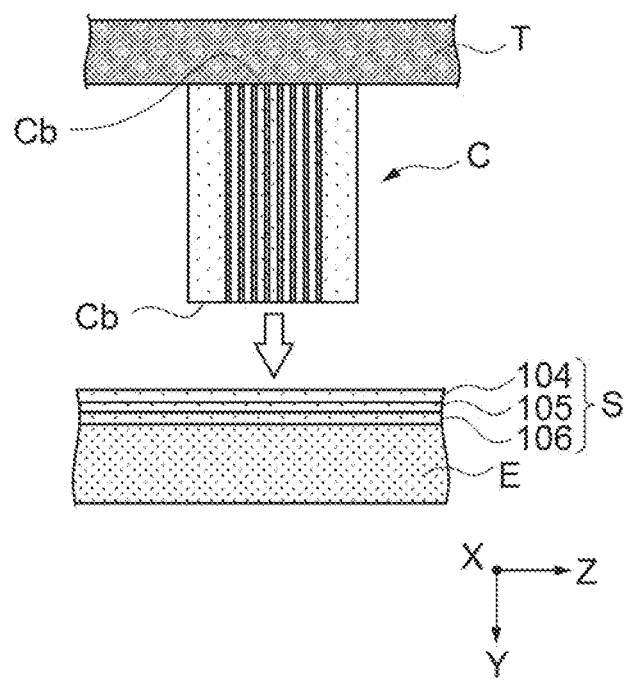
FIG. 10 is a schematic cross-sectional view showing a production process of the multi-layer ceramic capacitor.

First, as shown in FIG. 10, a lamination sheet S, which is a laminate of ceramic sheets, is disposed on a flat plate-like elastic member E. One side surface Cb of the multi-layer chip C, the other side surface Cb of which is held with a tape T, is caused to face the lamination sheet S.

In this embodiment, the lamination sheet S has a laminated structure including a first ceramic sheet 104, a second ceramic sheet 105, and a third ceramic sheet 106 for forming a side margin. Each of the first ceramic sheet 104, the second ceramic sheet 105, and the third ceramic sheet 106 contains a ceramic material, an organic binder, and other additive, in common with the ceramic sheets 101, 102, and 103.

The second ceramic sheet 105 has a heat shrinkage rate larger than the heat shrinkage rate of the first ceramic sheet 104. Moreover, the third ceramic sheet 106 has a heat shrinkage rate larger than the heat shrinkage rate of the second ceramic sheet 105. The heat shrinkage rate may be adjusted by adjusting the amount of the organic binder or additive.

Figure 11:
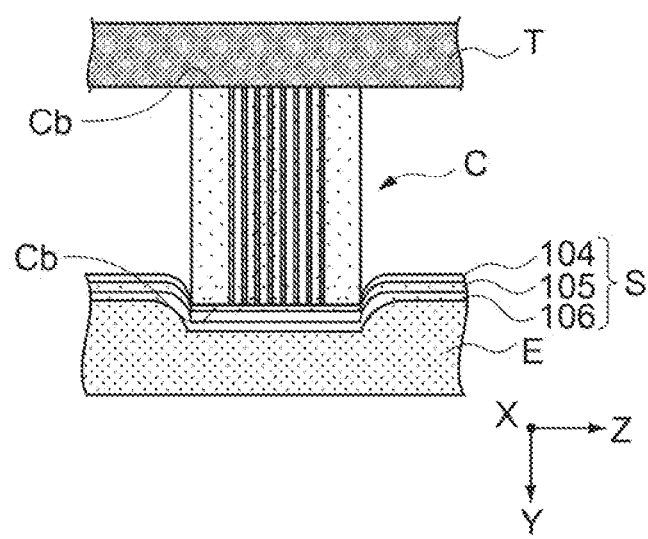
FIG. 11 is a schematic cross-sectional view showing a production process of the multi-layer ceramic capacitor.

Next, as shown in FIG. 11, the lamination sheet S is punched by the side surface Cb of the multi-layer chip C to attach the lamination sheet S to the side surface Cb. Specifically, the multi-layer chip C is forcefully pressed against the lamination sheet S toward the Y-axis direction. Accordingly, the multi-layer chip C locally sinks deep into the elastic member E together with the lamination sheet S. At that time, a shear force acts on the lamination sheet S along the outer edge of the side surface Cb. When the shear force has shear strength equal to or larger than shear strength of the lamination sheet S, the lamination sheet S is punched.

Figure 12:
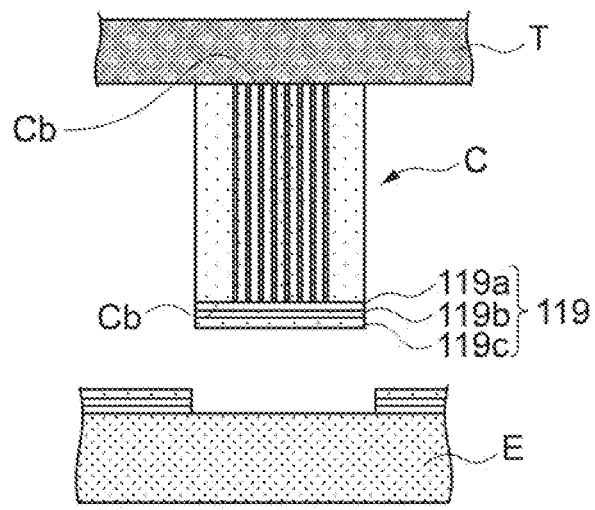
FIG. 12 is a schematic cross-sectional view showing a production process of the multi-layer ceramic capacitor.

As shown in FIG. 12, the portion of the lamination sheet S, which sinks together with the multi-layer chip C, is cut off. Accordingly, a first side margin 119a laminated on the side surface Cb, and a second side margin 119b laminated on the first side margin 119a are formed. Moreover, in this embodiment, a third side margin 119c laminated on the second side margin 119b is formed. With this configuration, an unsintered side margin 119 including the first side margin 119a, the second side margin 119b, and the third side margin 119c is formed on the side surface Cb of the multi-layer chip C.

Figure 13:
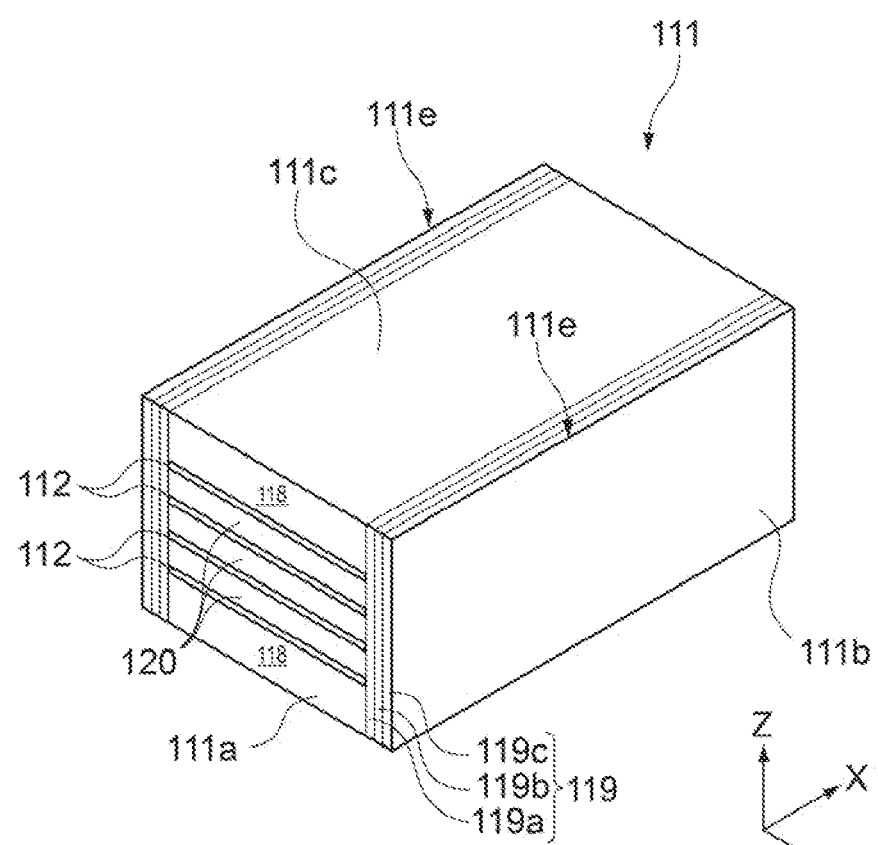
FIG. 13 is a perspective view showing a production process of the multi-layer ceramic capacitor.

The side margin 119 is similarly formed on the other side surface Cb. Accordingly, an unsintered ceramic body 111 shown in FIG. 13 is produced. At this stage, the recess 23 is not formed at a ridge 111e located between a main surface 111c and a side surface 111b.

3.3 Step S03: Sintering

In Step S03, the ceramic body 111 obtained in Step S02 is sintered, to produce the ceramic body 11 of the multi-layer ceramic capacitor 10 shown in FIG. 14 and FIGS. 1 to 3. A sintering temperature in Step S04 can be determined on the basis of a sintering temperature of the ceramic body 111. Further, sintering can be performed in a reduction atmosphere or a low-oxygen partial pressure atmosphere, for example.

Each of the first, second, and third side margins 119a, 119b, and 119c shrinks by heat at different ratios in sintering. Specifically, the second side margin 119b shrinks at a larger shrinkage amount than the shrinkage amount of the first side margin 119a. The third side margin 119c shrinks at a larger shrinkage amount than the shrinkage amount of the second side margin 119b.

Figure 14:
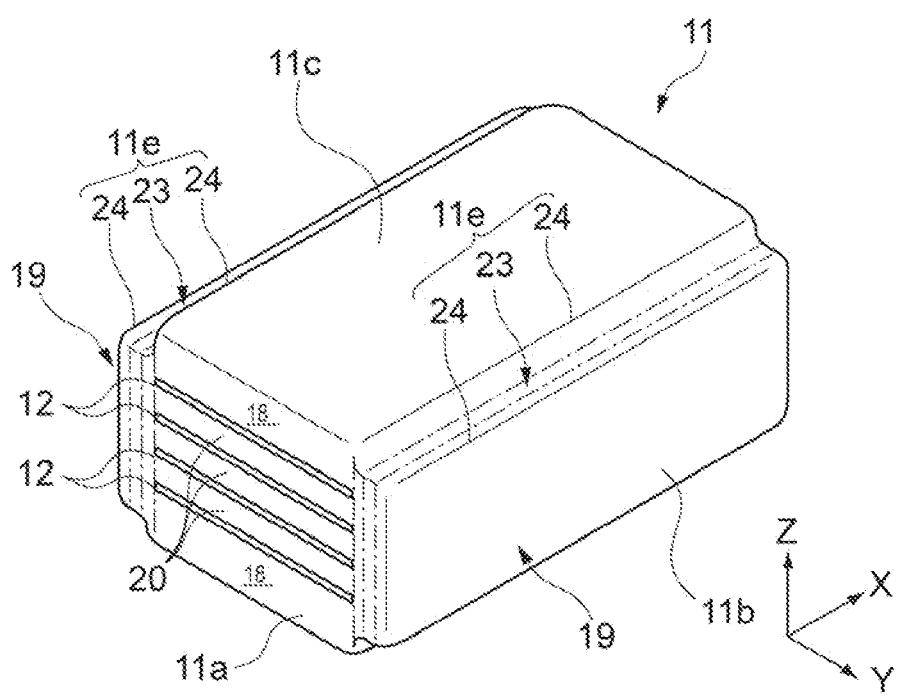
FIG. 14 is a perspective view showing a production process of the multi-layer ceramic capacitor.

As a result, as shown in FIG. 14, a gentle difference in level or a gentle inclination is formed at the ridge 11e of the ceramic body 11. The outer edge of each of the first, second, and third side margins 119a, 119b, and 119c shrinks inward in the Z-axis direction in the stated order, i.e., in ascending order regarding the shrinkage amount, to form the recess 23. The outer edge of the side surface Cb of the multi-layer chip C forms the edge 24 on the main surface 11c side. The outer edge of the third side margin 119c forms the edge 24 on the side surface 11b side.

It should be noted that FIG. 14 shows regions corresponding to the first, second, and third side margins 119a, 119b, and 119c of the side margin 19 by using chain lines, but the boundaries therebetween are hardly visible after sintering.

3.4 Step S04: Formation of Base Film

In Step S04, an electrically conductive base film 21 is formed. The electrically conductive base film 21 includes the end-surface-covering portion 25 formed on the end surface 11a, the side-surface-covering portions 26b formed on the side surfaces 11b, the main-surface-covering portions 26c formed on the main surfaces 11c, and the recess-covering portions 27 each formed on the recess 23 and each spaced apart from the side-surface-covering portion 26b and the main-surface-covering portion 26c.

Specifically, first, an unsintered electrode material is applied to the end surfaces 11a and also partially to the side surfaces 11b, the main surfaces 11c, and the ridges 11e, which are connected to the end surfaces 11a. The application method is, for example, dipping. In the dipping, each end surface 11a side of the ceramic body 11 is immersed into a dip tank containing an electrode material such as an electrically conductive paste. Accordingly, the unsintered electrode material can be applied also to the side surfaces 11b, the main surfaces 11c, and the recesses 23 almost simultaneously with the end surface 11a.

The unsintered electrode material is thinly applied such that the recess-covering portion 27 is spaced apart from the side-surface-covering portion 26b and the main-surface-covering portion 26c after baking. However, the recess-covering portion 27 and the side-surface-covering portion 26b or the main-surface-covering portion 26c do not need to be spaced apart from each other when the unsintered electrode material is applied. The thickness of the electrode material to be applied is adjustable depending on an immersion time, a speed at which the ceramic body 11 is immersed and then pulled up, the viscosity of the electrode material, and the like.

It should be noted that the method of forming the base film is not limited to the dipping and may be, for example, printing, sputtering, or a method of using them in combination.

Subsequently, the unsintered electrode material is baked. Baking can be performed in a reduction atmosphere or a low-oxygen partial pressure atmosphere, for example. At the time of baking, the electrode material applied to each surface shrinks by heat. The shrinkage rate of the electrode material is larger than the shrinkage rate of the ceramic body 11. Thus, the electrode material applied to each surface generates tensile stress toward a direction moving apart from the ridge 11e. Accordingly, the recess-covering portion 27 is formed to be spaced apart from the side-surface-covering portion 26b and the main-surface-covering portion 26c.

3.5 Step S05: Formation of Plating Film

In Step S05, a plating film 22 is formed. The plating film 22 continuously covers the end-surface-covering portion 25, the side-surface-covering portions 26b, the main-surface-covering portions 26c, and the recess-covering portions 27. Specifically, electrolytic plating is performed by immersing the multi-layer ceramic capacitor 10, on which the base film 21 is formed, into a plating solution corresponding to each of the intermediate film 28 and the surface film 29. Accordingly, the plating film 22 including a plurality of layers, i.e., the intermediate film 28 and the surface film 29, is formed.

As described above, the multi-layer ceramic capacitor 10 shown in FIGS. 1 to 3 is produced. In this embodiment, the side margins 119 are provided to the multi-layer chip C in a later step, and thus the positions of the end portions of the first and second internal electrodes 112 and 113 are aligned with one another within the range of 0.5 µm in the Y-axis direction. This allows the ratio of the volume of the capacitance forming unit 16 to the ceramic body 11 to be increased, and allows the capacity to be increased without increasing the size of the multi-layer ceramic capacitor 10.

4. Other Embodiments

Hereinabove, the embodiment of the present disclosure has been described, but the present disclosure is not limited to the embodiment described above. It should be appreciated that the present disclosure may be variously modified without departing from the gist of the present disclosure.

The number of ceramic sheets forming each side margin 19 is not limited to three. For example, if the number of ceramic sheets forming each side margin 19 is set to two or more and four or less, a recess 23 with a desired shape can be formed and the occurrence of defects such as peeling of the side margins 19 can be prevented after attachment.

For example, the embodiment has been described that the lamination sheet S, on which different ceramic sheets are laminated, is attached to form the unsintered side margin 119, but a plurality of ceramic sheets may be attached one by one.

Further, the method of attaching a ceramic sheet is not limited to the punching of the sheet. A ceramic sheet cut in advance in a predetermined size may be attached to the side surface Cb.

Alternatively, the side margin 19 may be formed by applying ceramic materials having different heat shrinkage rates to the side surface Cb of the multi-layer chip C in layers. This also makes it possible to form a laminated structure of a plurality of side margins having different heat shrinkage rates.

Further, the recess can also be formed if the cover 18 is formed of a plurality of ceramic sheets having different heat shrinkage rates. In this case, a plurality of ceramic sheets each including a side margin portion formed in the circumference of the internal electrode are laminated, and another plurality of ceramic sheets, which have heat shrinkage rates gradually increasing with distance from the upper side or lower side in the Z-axis direction of the laminate of the ceramic sheets previously laminated, are laminated. Accordingly, a ridge including a recess is formed at the outer edge portion of the ceramic sheets for forming the cover.

Moreover, the present disclosure is not limited to the method of forming the recess by heat shrinkage of the ceramic material. The recess may be formed by grinding the ridge of a ceramic body formed in a rectangular parallelepiped shape.

In the embodiment described above, the multi-layer ceramic capacitor 10 has been described as an example of a multi-layer ceramic electronic component, but the present disclosure is applicable to any other multi-layer ceramic electronic components each including laminated ceramic layers and internal electrodes. Examples of such multi-layer ceramic electronic components include a chip varistor, a chip thermistor, and a multi-layer inductor.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A multi-layer ceramic electronic component, comprising:
   a ceramic body including
      a protective portion including
         an end surface facing in a first direction,
         circumferential surfaces connected to the end surface and extending in the first direction, and
         a ridge that includes a recess and an outer edge and connects the circumferential surfaces, the recess extending along the first direction, the outer edge including an edge, the edge being formed at the outer edge and bulging outward, and
      a functional portion disposed inside the protective portion; and
   an external electrode including
      a base film covering the end surface,
      an intermediate film formed on the base film, and
      a surface film formed on the intermediate film, wherein
   the base film includes
      a first covering portion formed on the end surface,
      second covering portions formed on the respective circumferential surfaces, and
      a third covering portion formed on the recess and spaced apart from at least one of the second covering portions at the edge, and
   the intermediate film continuously covers the first covering portion, the second covering portions, and the third covering portion.

2. The multi-layer ceramic electronic component according to claim 1, wherein
   the functional portion includes internal electrodes laminated in a second direction orthogonal to the first direction, and
   positions of end portions of the internal electrodes in a third direction orthogonal to the first direction and the second direction are aligned with one another within a range of 0.5 µm in the third direction.

3. A method of producing a multi-layer ceramic electronic component, the method comprising:
producing a ceramic body, the ceramic body including
a protective portion including
an end surface facing in a first direction,
circumferential surfaces connected to the end surface and extending in the first direction, and
a ridge that includes a recess and an outer edge and connects the circumferential surfaces, the recess extending along the first direction, the outer edge including an edge, the edge being formed at the outer edge and bulging outward, and
a functional portion disposed inside the protective portion;
forming an electrically conductive base film, the base film including
a first covering portion formed on the end surface,
second covering portions formed on the respective circumferential surfaces, and
a third covering portion formed on the recess and spaced apart from at least one of the second covering portions at the edge;
forming an intermediate film that continuously covers the first covering portion, the second covering portions, and the third covering portion, and
forming a surface film on the intermediate film.

4. The method of producing a multi-layer ceramic electronic component according to claim 3, wherein
the producing a ceramic body includes
producing a ceramic multi-layer chip, the ceramic multi-layer chip including internal electrodes laminated in a second direction orthogonal to the first direction, the internal electrodes being exposed from a side surface of the ceramic multi-layer chip, the side surface facing in a third direction orthogonal to the first direction and the second direction,
forming
a first side margin laminated on the side surface, and
a second side margin laminated on the first side margin and having a heat shrinkage rate larger than a heat shrinkage rate of the first side margin, and
sintering the ceramic multi-layer chip, the first side margin, and the second side margin.

5. The method of producing a multi-layer ceramic electronic component according to claim 4, wherein
the first side margin is formed by attaching a first ceramic sheet to the side surface, and
the second side margin is formed by attaching a second ceramic sheet to the first ceramic sheet, the second ceramic sheet having a heat shrinkage rate larger than a heat shrinkage rate of the first ceramic sheet.

* * * * *